US008119177B2

(12) United States Patent
Prestini

(10) Patent No.: US 8,119,177 B2
(45) Date of Patent: Feb. 21, 2012

(54) METHOD FOR PREPARING A CRUMBLY DAIRY PRODUCT WITH EXPANDED STRUCTURE

(75) Inventor: Luigi Prestini, Manerbio (IT)

(73) Assignee: San Lucio S.r.l. (IT)

( * ) Notice: Subject to any disclaimer, the term of this patent is extended or adjusted under 35 U.S.C. 154(b) by 817 days.

(21) Appl. No.: 10/965,548

(22) Filed: Oct. 14, 2004

(65) Prior Publication Data

US 2006/0008572 A1   Jan. 12, 2006

(30) Foreign Application Priority Data

Jul. 9, 2004 (EP) ................................ 04425510

(51) Int. Cl.
*A23C 19/00* (2006.01)
(52) U.S. Cl. ........ 426/242; 426/245; 426/520; 426/512; 426/582; 426/518
(58) Field of Classification Search .......... 426/582, 426/242, 237, 443, 445, 456, 514, 515, 243–245, 426/512, 520; *A23C 19/00*
See application file for complete search history.

(56) References Cited

U.S. PATENT DOCUMENTS

| 2,683,665 | A | * | 7/1954 | Traisman et al. | 426/388 |
| 3,502,479 | A | * | 3/1970 | Beltran et al. | 426/242 |
| 3,609,866 | A | * | 10/1971 | De Jonge | 99/458 |
| 3,703,379 | A | * | 11/1972 | Cummisford | 426/242 |
| 4,251,551 | A | * | 2/1981 | VanHulle et al. | 426/94 |
| 4,719,118 | A | * | 1/1988 | Thomas | 426/580 |
| 4,803,090 | A | | 2/1989 | Schlipalius et al. | |
| 5,165,948 | A | * | 11/1992 | Thomas | 426/242 |
| 5,338,556 | A | * | 8/1994 | Schwab et al. | 426/241 |
| 5,342,635 | A | * | 8/1994 | Schwab et al. | 426/241 |
| 5,365,643 | A | * | 11/1994 | Fujimoto | 29/25.35 |
| 5,451,419 | A | * | 9/1995 | Schwab et al. | 426/564 |
| 5,795,613 | A | * | 8/1998 | Scharfmann et al. | 426/582 |
| 5,980,962 | A | * | 11/1999 | Bracken et al. | 426/241 |
| 6,455,092 | B1 | * | 9/2002 | Begueria | 426/582 |
| 2004/0101592 | A1 | * | 5/2004 | Gasparelli et al. | 426/34 |
| 2005/0031758 | A1 | * | 2/2005 | Scharfman | 426/582 |
| 2006/0110518 | A1 | * | 5/2006 | Thompson | 426/582 |

FOREIGN PATENT DOCUMENTS

| DE | 195 41 205 A | | 5/1997 |
| FR | 2 750 015 A | | 12/1997 |
| JP | 02039849 A | * | 2/1990 |
| WO | WO 9853697 A1 | * | 12/1998 |
| WO | WO 03/061394 A1 | | 7/2003 |

OTHER PUBLICATIONS http://www.realcaliforniamilk.com/content/real-california-cheese-guide, Date N/A, p. 1-10.*

* cited by examiner

*Primary Examiner* — Drew E Becker
*Assistant Examiner* — Steven Leff
(74) *Attorney, Agent, or Firm* — Akerman Senterfitt

(57) ABSTRACT

Method for the preparation of a crumbly, and expanded dairy product, comprising the steps of subjecting a hard cheese with a humidity content lower than or equal to 45% to a microwave treatment until a crumbly and expanded product with a humidity content lower than 15% is obtained, which is subjected to immediate cooling with dry air at 4-10° C., wherein the starting hard cheese is finely divided.

8 Claims, No Drawings

METHOD FOR PREPARING A CRUMBLY DAIRY PRODUCT WITH EXPANDED STRUCTURE

FIELD OF APPLICATION

The present invention generally relates to the field of the milk-dairy industry.

In particular, the invention relates to a method for the preparation of a crumbly, crunchy, expanded dairy product starting from hard cheeses.

For the sake of clarity, reference will be mainly made to Grana Padano; however, it will be intended that what is disclosed and claimed extends also to similar hard cheeses, such as, for example, Parmigiano Reggiano, other Parmesan-like cheeses, Sardinian Pecorino, Roman, Sicilian and Tuscan Pecorino, Sbrinz, etc.

BACKGROUND OF THE INVENTION

Hard cheeses, and in particular Grana Padano and Parmigiano Reggiano, which have always been traditionally used in Italy as such, as cheeseboard cheeses, as well as in the grated form as seasoning to main and second course dishes and, in the form of flakes in addition to preparations such as "carpaccio" (thinly sliced meat) and "bresaola" (cured beef, have long been enjoying an increasing success in other European and extra-European countries also.

This success is due not only to the dietary-nutritional characteristics thereof (high protein content associated with a relatively low fat level, high vitamin and calcium content) but also to the intense, balanced flavour thereof.

Hard cheeses, and mainly Grana Padano and Parmigiano Reggiano, are often offered in irregular pieces or flakes as appetizers or as snack-food at receptions, cocktails, wine tasting sessions and the like. In this case the pieces must be prepared on the spot, so that the organoleptic properties of the cheese do not deteriorate. Moreover, it is difficult to avoid greasing one's fingers when consuming them, as the thick consistency of the cheese prevents the use of toothpicks or other picking up means.

There thus exists the need to provide a product having the excellent organoleptic and nutritional characteristics of hard cheeses but which is also more versatile and in particular more suitable for consumption as a snack or appetizer.

A first solution to the above need has been provided by the dairy product disclosed in the patent application FR 2 750 015. It is a dry and expanded dairy product obtained by subjecting curd grains or cheese pieces or flakes to a drying-expanding treatment through the passage in a vacuum microwave oven at a temperature lower than 40° C., up to a humidity content lower than 10% by weight.

The product according to FR 2 750 015 exhibits a pop-corn type spheroid shape, when obtained from the curd, and a chip shape, when obtained from cheese flakes.

The shape of the final product is thus quite limited and dictated by the shape of the starting product.

As it is known, the snack-food industry endeavours to offer the public the widest possible choice, by providing snacks of the most varying and attractive shapes.

SUMMARY OF THE INVENTION

The problem underlying the present invention has been exactly that of providing a crumbly and expanded dairy product, particularly suitable for the consumption as a snack, having the organoleptic and nutritional characteristics of the starting cheese and being available in an unlimited number of shapes.

Such a problem has been solved, according to the invention, by a method which comprises the steps of subjecting a hard cheese, with a humidity content lower than or equal to 45%, to a microwave treatment until a crumbly and expanded product, with a humidity content lower than 15% is obtained, which is subjected to immediate cooling with dry air at 4-10° C., characterised in that the starting hard cheese is finely divided, with particle sizes comprised between 0.2 and 5 mm.

The humidity content of the final, expanded product is preferably comprised between 3% and 8%.

The microwave power is preferably comprised between 500 and 900 watt and advantageously between 700 and 800 watt and the duration of the treatment is preferably comprised between 25 and 240 seconds.

The microwave treatment can be carried out in an oven, possibly under vacuum.

The finely divided hard cheese is prepared by grating the cheese and by selecting the particles of suitable particle size by sieving. The particles which do not fall within the above defined limits are sent back to the grating step.

The finely divided cheese is then deposited as a uniform layer inside moulds of any shape and sent on to the microwave treatment.

The layer of finely divided cheese deposited inside the moulds should preferably have a thickness comprised between 2 and 25 mm, advantageously between 3 and 15 mm.

Conveniently, a tunnel microwave oven can be used, inside of which a conveyor belt is made to run while carrying a plurality of Teflon coated moulds filled with a uniform layer of the finely divided cheese.

During the microwave treatment, the water molecules contained in the finely divided cheese evaporate very easily, also thanks to the very high specific surface area of the product. In this way, it is possible to control the supply of energy so that the organoleptic and nutritional properties of the product are not damaged in any way.

Simultaneously to the water evaporation, melting of the fat part of the cheese particles also takes place, with the formation of a porous, expanded mass. The subsequent fast cooling with cold air stabilises the expanded product obtained. Such cooling is conveniently carried out on the product exiting the microwave oven, deposited in the moulds, which pass from a horizontal to a vertical position and finally to an upturned position, which determines the detaching of the product from the mould.

A remarkable amount of the fat melted out during the microwave treatment remains adhered onto the mould. As a consequence the final product exhibits a dietary-nutritional profile which is even better than that of the starting cheese, given the increased protein/fat ratio. Such reduction in the fat content is strongly favoured by the fact that the starting cheese is finely divided. In fact, by starting from cheese pieces or flakes, a much lower decrease in fat content occurs.

It should be noted that the method according to the present invention, differently to the known one of the above cited French application, makes it possible to confer the most disparate shapes to the obtained expanded products, for example the shape of a bread-stick, of a cracker, of a chip, shapes of animals, objects etc., depending on the moulds used. The dimensions can also be varied at will, even obtaining products in the form of plates or baskets, which can then be filled up with salads, sauces, cured meats, etc.

The product obtained with the method according to the present invention may be consumed not only as such, as a snack or as an appetizer, but also as a crouton for soups and broths or it can be dipped in sauces, like tortillas.

A further advantage of the crumbly, expanded dairy product according to the present invention lies in that it is not at all greasy thus not suffering the drawback of hard cheese pieces or flakes of greasing consumers' fingers. This is very important when using the product as a snack or appetizer for cocktail-type receptions.

The absolute absence of any additive or ingredient other than cheese should also be stressed, which helps maintain the organoleptic characteristics of the starting cheese.

Finally, the high specific protein content of the expanded dairy product according to the present invention, together with a low fat content, makes it particularly suitable for being used as a food supplement for sportsmen or for dietary purposes.

DETAILED DESCRIPTION OF THE INVENTION

The method according to the present invention will be further described making reference to some examples provided hereafter by way of illustrative and non limiting examples.

EXAMPLE 1

Seasoned Grana Padano with humidity content of 32% was separated from the rind and grated with a conventional industrial grater, obtaining a powdered product with particle size comprised between 0.2 and 20 mm. The product was sieved with a vibrating sieve, obtaining, at the output of the sieve, particles of sizes comprised between 0.2 and 2 mm. The product held back on the sieve was sent back to the grater.

The grated and sieved cheese was then sent on to a dosing vat, from which it was distributed into elongated Teflon coated moulds aligned in parallel lines on an oven conveyor belt. Each mould was filled with the product and subsequently the excess product was removed by trimming and then recovered and supplied again into the doser.

In this way each mould contained about 3 g of grated cheese for a thickness of 6 mm.

The conveyor belt then transported the moulds inside a tunnel microwave oven, wherein the product was subjected to the microwave action with a power of 800 watt for 40 seconds. The product exiting the oven had a shape similar to that of a small bread-stick and had a highly expanded structure, and a temperature of about 40° C. The belt exiting the oven was deviated in such a way as to bring the moulds, first in a vertical, and then in an upturned position while they were blown by a stream of dry air at 6° C. The air-cooling was continued also after the substantially bread-stick shaped expanded product had been detached from the mould, to achieve its stabilisation and to prevent it from absorbing humidity from the air.

Once the cooling had been completed, the expanded product, which had a humidity content of 5%, was stored prior to proceeding with the packaging thereof in an inert atmosphere.

The obtained expanded product was subjected to quantitative analysis to determine the fat, protein and carbohydrate contents.

The results of the analysis are shown in the following table, and compared with the values obtained from the starting Grana Padano.

TABLE

|  | Expanded product | Grana Padano |
|---|---|---|
| Fat | 35% | 28% |
| Protein | 47% | 33% |
| Carbohydrate | 6% | 3% |
| Humidity | 5% | 30% |
| Ash | 7% | 6% |
| Energetic value | 535 kcal/100 g | 390 kcal/100 g |

The fat content of the expanded product according to the present invention, if calculated on a dry weight basis, turns out to be remarkably lower than that of the starting Grana Padano: 36.8% compared to 40.0% of the Grana Padano.

Moreover, the protein content, calculated on a dry weight basis, is definitely higher than that of the starting Grana Padano: 49.5% against 47.1% of the Grana Padano.

The above reported data confirm that the method according to the present invention determines a significant reduction in the fat level compared to the starting cheese, resulting in a food which is particularly suitable for being used as a food supplement for sportsmen or for dietary purposes.

EXAMPLE 2

Seasoned Grana Padano with humidity content of 32% was separated from the rind and grated as described in the previous example, obtaining a powdered product with particle size comprised between 0.2 and 20 mm. The product was sieved with a vibrating sieve, obtaining, at the output of the sieve, particles with sizes comprised between 0.2 and 4 mm. The product held back on the sieve was sent back to the grater.

The grated and sieved cheese was then sent on to a dosing vat, from which it was distributed into ellipsoidal Teflon coated moulds aligned in parallel lines on an oven conveyor belt. Each mould was filled with the product and subsequently the excess product was removed by trimming and then recovered and supplied again into the doser.

The thickness of the layer of grated cheese inside each mould was about 10 mm.

The conveyor belt then transported the moulds inside a tunnel microwave oven, wherein the product was subjected to the microwave action with a power of 800 watt for 30 seconds. The product exiting the oven had a shape similar to that of a chip and had a highly expanded structure, and a temperature of about 38° C. The belt exiting the oven was deviated in such a way as to bring the moulds first in a vertical and then in an upturned position while they were blown by a stream of dry air at 8° C. The air-cooling was carried out in the same way as in example 1.

Once the cooling had been completed, the expanded product, which had humidity content of 7.5%, was stored prior to proceeding with the packaging thereof in an inert atmosphere.

EXAMPLE 3

Seasoned Parmigiano Reggiano with humidity content of 30% was separated from the rind and grated as described in the previous example, obtaining a powdered product with particle size comprised between 0.2 and 20 mm. The product was sieved with a vibrating sieve, obtaining, at the output of the sieve, particles with sizes comprised between 0.2 and 3 mm. The product held back on the sieve was sent back to the grater.

The grated and sieved cheese was then sent on to a dosing vat, from which it was distributed into rectangular Teflon coated moulds aligned in parallel lines on an oven conveyor belt. Each mould was filled with the product and subsequently the excess product was removed by trimming and then recovered and supplied again into the doser.

In this way each mould contained a layer of grated cheese with a thickness of 7 mm.

The conveyor belt then transported the moulds inside a tunnel microwave oven, wherein the product was subjected to the microwave action with a power of 800 watt for 50 seconds. The product exiting the oven had shape and dimensions similar to those of a rectangular cracker and had a highly expanded structure and a temperature of about 45° C. The belt exiting the oven was deviated in such a way as to bring the moulds first in a vertical and then in an upturned position while they were blown by a stream of dry air at 8° C. The air-cooling was carried out in the same way as in example 1.

Once the cooling had been completed, the expanded product, which had a humidity content of 6%, was stored prior to proceeding with the packaging thereof in an inert atmosphere.

I claim:

1. A method for the preparation of a dairy snack product, comprising the steps of:
    grating and subsequently sieving a hard cheese selected from the group consisting of Grana Padano, Parmigiano Reggiano, Tuscan, Roman, Sicilian and Sardinian Pecorino, Sbrinz, other Parmesan-like cheeses, and mixtures thereof to produce a finely divided hard cheese having particle sizes of only between 0.2 mm and 5 mm and having a moisture content lower than or equal to 45%;
    distributing the finely divided hard cheese in a uniform layer inside molds prior to being sent to a microwave treatment;
    subjecting the finely divided hard cheese in the molds to the microwave treatment for between 25 and 240 seconds until a snack product with a moisture content lower than 15% is obtained;
    subjecting the snack product exiting the microwave treatment to immediate cooling with air at 4-10° C.; and
    moving the molds to an upturned position after the microwave treatment such that an amount of fat melted out of the finely divided hard cheese during the microwave treatment remains adhered onto the molds and the snack product that detaches from the molds in the upturned position has a lower fat content and a higher protein content than that of the finely divided hard cheese.

2. The method according to claim 1, wherein the microwave power is comprised between 500 and 900 watt.

3. The method according to claim 1, wherein the microwave treatment is carried out in a vacuum oven.

4. The method according to claim 1, wherein said molds are supported on a conveyor belt and said microwave treatment occurs inside a tunnel oven.

5. The method according to claim 1, wherein said molds are coated with Teflon.

6. The method of claim 1, wherein the uniform layer of finely divided hard cheese distributed in the molds has a thickness of between 2 and 25 mm.

7. The method of claim 1, wherein the step of moving the molds to an upturned position is carried out during the immediate cooling step.

8. A method for the preparation of a dairy snack product, comprising the steps of:
    grating and subsequently sieving a hard cheese selected from the group consisting of Grana Padano, Parmigiano Reggiano, Tuscan, Roman, Sicilian and Sardinian Pecorino, Sbrinz, other Parmesan-like cheeses, and mixtures thereof to produce a finely divided hard cheese having particle sizes of only between 0.2 mm and 5 mm and having a moisture content lower than or equal to 45%;
    distributing the finely divided hard cheese inside molds prior to being sent to a microwave treatment;
    subjecting the finely divided hard cheese in the molds to the microwave treatment for between 25 and 240 seconds until a snack product with a moisture content lower than 15% is obtained;
    moving the molds to an upturned position to remove the microwaved snack product from the molds such that an amount of fat melted out of the finely divided hard cheese during the microwave treatment remains adhered onto the molds and the snack product that detaches from the molds in the upturned position has a lower fat content and a higher protein content than that of the finely divided hard cheese; and
    subjecting the obtained snack product to a fast cooling process with air at 4-10° C.

* * * * *